United States Patent [19]

Kuwayama et al.

[11] Patent Number: 4,734,905
[45] Date of Patent: Mar. 29, 1988

[54] OPTICAL HEAD DEVICE

[75] Inventors: Tetsuro Kuwayama, Yokohama; Shigeyuki Suda; Yasuo Nakamura, both of Tokyo, all of Japan

[73] Assignees: Canon Kabushiki Kaisha, Tokyo; Canon Denshi K.K., Chichibu, both of Japan

[21] Appl. No.: 678,593

[22] Filed: Dec. 5, 1984

[30] Foreign Application Priority Data

Dec. 7, 1983 [JP] Japan ................. 58-229837

[51] Int. Cl.$^4$ ............................. G11B 7/135
[52] U.S. Cl. .................... 369/111; 369/112; 350/500
[58] Field of Search ............... 350/500; 369/111, 112, 369/109, 119

[56] References Cited

U.S. PATENT DOCUMENTS

| 3,479,108 | 11/1969 | Humphrey | 350/500 |
| 3,884,548 | 5/1975 | Linder | 350/500 |
| 3,960,443 | 6/1976 | Goshima | 369/100 |
| 4,198,657 | 4/1980 | Kanamaru | 369/112 |
| 4,451,913 | 5/1984 | Elliott | 369/111 |
| 4,453,241 | 6/1984 | Veerdonk | 369/112 |
| 4,607,356 | 8/1986 | Bricot | 369/111 |

FOREIGN PATENT DOCUMENTS

| 2527335 | 1/1976 | Fed. Rep. of Germany | 369/111 |
| 51-1102 | 1/1976 | Japan | 369/111 |
| 56-29846 | 3/1981 | Japan | 369/112 |

Primary Examiner—Alan Faber
Attorney, Agent, or Firm—Fitzpatrick, Cella, Harper & Scinto

[57] ABSTRACT

An optical head device comprising a light source unit, a deflecting element for changing the direction of travel of a light beam emitted from the light source unit, and a condensing element for condensing the light beam on a recording medium. A movable portion is formed so that the deflecting element and the condensing element move substantially together with each other relative to the recording medium, and the deflecting element is designed such that the variation in direction of the emergent light beam from the movable portion caused by the rotative displacement of the movable portion with respect to at least one axis can be decreased.

5 Claims, 12 Drawing Figures

OPTICAL HEAD DEVICE

BACKGROUND OF THE INVENTION

1. Field of the Invention

This invention relates to improvements in the optical head device of an optical information reproducing apparatus for optically reading out information recorded on a recording medium or an optical information recording-reproducing apparatus for optically recording and reproducing information on a recording medium, and particularly to an optical head device in which the light source unit is fixed and the movable portion comprising deflecting means and condensing means is movable.

2. Description of the Prior Art

Generally, in apparatuses for optically effecting recording and reproduction of information, it is desired that the time required for searching the information be as short as possible.

For example, in an optical disc apparatus, to realize high-speed random access, it is necessary to move the optical head unit radially of the disc at a high speed and for this purpose, attempts have been made to make the entire optical head unit compact and light in weight. However, if the output of the light source such as a semiconductor laser is increased to accomplish high-speed random access, a heavy heat sink will necessarily be required with a result that rather the access time becomes longer.

Figure 1:
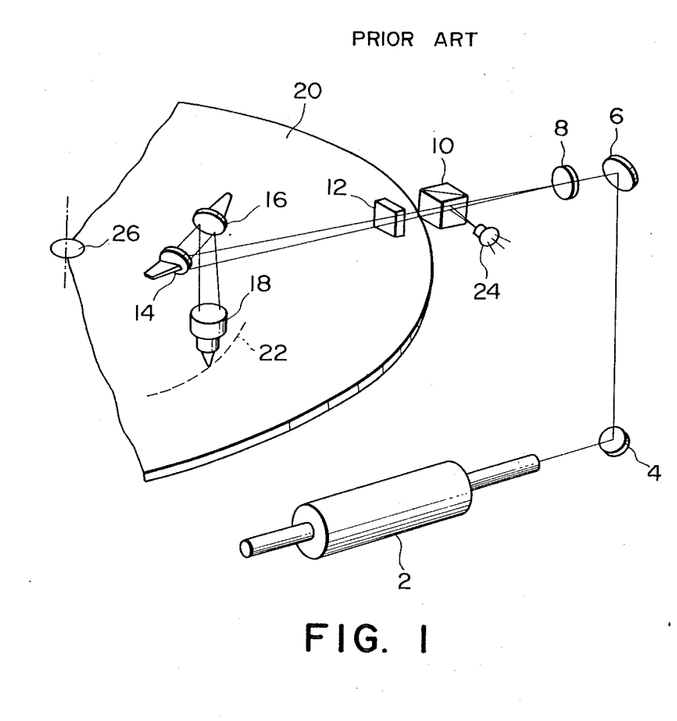
FIG. 1 is a view illustrating the principle of the construction of the optical head device according to the prior art.

FIG. 1 of the accompanying drawings shows an optical head device according to the prior art. A linearly polarized light beam emitted from a light source 2 such as a laser is reflected by mirrors 4 and 6, is made into a divergent light beam by a lens 8 and enters a polarizing beam splitter 10. The linearly polarized light beam thus entering has its plane of vibration set in a direction in which it is transmitted through the polarizing beam splitter 10 and therefore, it is transmitted through the polarizing beam splitter 10, is made into a circularly polarized light by a phase plate 12 such as a quarter wavelength plate and is reflected by mirrors 14 and 16 which are deflecting means, whereafter it enters a condensing lens 18 which is condensing means, whereby it is condensed on an information recording portion 22 such as a pit on a substrate 20 such as an optical disc. The reflected light beam reflected by the information recording portion 22 travels back along the above-described optical path, and is made into a linearly polarized light having a plane of vibration orthogonal to that during the incidence, by the phase plate 12. This linearly polarized light cannot pas through the polarizing beam splitter 10 but is reflected by the polarizing beam splitter 10, and enters a photodetector 24, whereby the information on the substrate 20 is detected. The mirrors 14 and 16 are rotated for tracking and time axis correction to thereby effect light deflection.

In this example of the prior art, the access in the radial direction of the substrate 20 is effected by moving the rotary shaft 26 of the substrate 20 and therefore, high-speed access is impossible.

Thus, in order to realize high-speed access, it is desired to make the condensing lens 18 and the mirrors 14, 16 into a block movable radially of the substrate 20, and as a device which satisfies this desire, there has been devised an optical head device in which the light source and the photodetector are separate from the condensing lens system and only the condensing lens system is movable. In the condensing lens system of such an optical head device, a single mirror has been used to cause a light beam to enter the condensing lens.

Figure 2A:
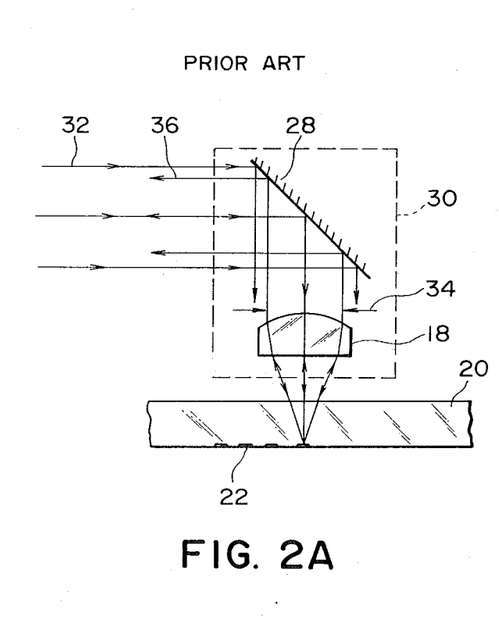
FIG. 2A illustrates the construction of the movable portion of the optical head device according to the prior art.
Figure 2B:
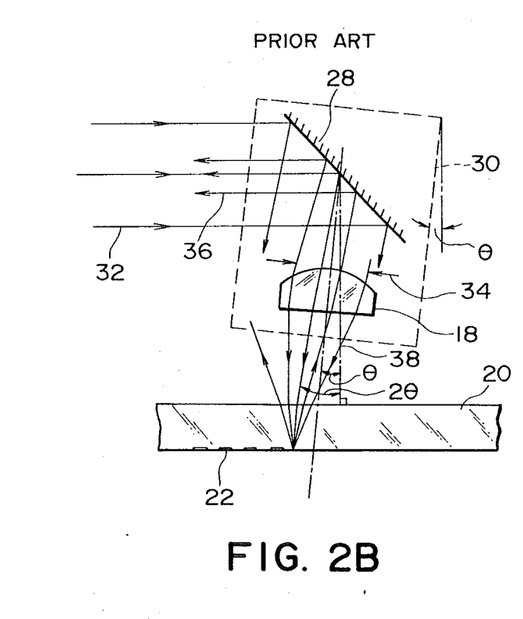
FIG. 2B illustrates a state in which the movable portion in FIG. 2A is inclined.

FIGS. 2A and 2B of the accompanying drawings are enlarged views of the essential portions of a conventional optical head device using the above-mentioned single mirror. FIG. 2A shows a state in which a movable portion 30 comprising a mirror 28 and a condensing lens 18 is disposed at an appropriate angle and position, and FIG. 2B shows a state in which the movable portion 30 is inclined by an angle $\theta$ as compared with the state of FIG. 2A.

In FIG. 2A, the incident light beam 32 is reflected in an appropriate direction by the mirror 28 and becomes a light beam which enters a substrate 20 perpendicularly thereto, and the quantity of light of this light beam is limited by a stop 34, whereafter the light beam is condensed on the information recording portion 22 of the substrate 20, whereat it is reflected and then travels back along the original optical path. At this time, the reflected light beam reflected by the information recording portion 22 emerges from the stop 34 over the full effective diameter thereof and becomes a reflected light beam 36.

Now, when the movable portion 30 is inclined by an angle $\theta$ with respect to the vertical axis 38 of the substrate 20 as shown in FIG. 2B, the reflected light beam reflected by the information recording portion 22 travels in a direction forming an angle $2\theta$ with respect to the vertical axis 38 of the recording medium 20 and at the same time, the optic axis of the condensing lens 18 also forms an angle $\theta$ with respect to said vertical axis 38. Therefore, the reflected light beam passes through a position laterally deviated from the stop 34 and thus, an unnegligible quantity of light is lost.

The light beam passed through the stop 34 emerges as a reflected light beam 36 through the condensing lens 18 and the mirror 28. As shown, the quantity of light of the reflected light beam 36 is smaller than the quantity of light of the incident light beam 32. In FIG. 2B, the reflected light beam 36 is depicted so as to be coaxial with the incident light beam 32, but this is only for the purpose of schematic representation and actually, the center of the optic axis of the incident light beam 32 is not coincident with the center of the optic axis of the reflected light beam 36, that is, the reflected light beam inclines relative to the incident light beam and therefore, the light beam detected by a photodetector (not shown) becomes deviated from its original appropriate position and thus, a detection error occurs.

Further, when the movable portion 30 is inclined by an angle $\theta$ with respect to the vertical axis 38 of the substrate 20, the light beam condensed on the information recording portin 22 also becomes deviated from the original position of the condensed light beam, whereby coma and astigmatism are liable to occur.

That is, the optical head device shown in FIGS. 2A and 2B has the following disadvantages which result from the deflecting means and the condensing means being inclined from their proper angles:

(1) The quantity of light of the reflected light is lost;

(2) Deviation occurs between the incident light and the reflected light and a detection error occurs; and (3) Coma and astigmatism occur.

SUMMARY OF THE INVENTION

It is an object of the present invention to provide an optical head device which can eliminate the above-noted disadvantages, that is, an optical head device in which a decrease in quantity of light, a detection error and aberrations do not occur even if the movable portion is inclined during high-speed access.

In the optical head device according to the present invention, deflecting means for directing the light beam from a light source unit toward condensing means has means for correcting any variation in direction of the light beam travelling from the deflecting means toward the condensing means which is caused by inclination of the movable portion, whereby the above object is achieved. That is, the deflecting means is endowed with means for ensuring the optic axis of the light beam travelling from the deflecting means toward a recording medium to enter the recording medium perpendicularly thereto even if the deflecting means is inclined.

In the optical head device according to the present invention, the condensing means and the deflecting means are fixed to a housing so that the positional relation between the condensing means and the deflecting means is always constant, and this housing is moved relative to the recording medium by moving means or the condensing means and the deflecting means are moved together, but it is also possible to hold the condensing means so that the optic axis thereof is always perpendicular to the recording medium. In the former case, when the movable portion is inclined, the optic axis of the condensing means is also inclined with respect to the recording medium and therefore, in this case, the condensing means is endowed with a predetermined off-axis aberration characteristic (coma) so that the light beam entering from a direction inclined with respect to the optic axis of the condensing means is imaged on the recording medium substantially without aberrations.

DESCRIPTION OF THE PREFERRED EMBODIMENTS

Some embodiments of the present invention will hereinafter be described specifically and in detail by reference to the drawings.

[First Embodiment]

Figure 3A:
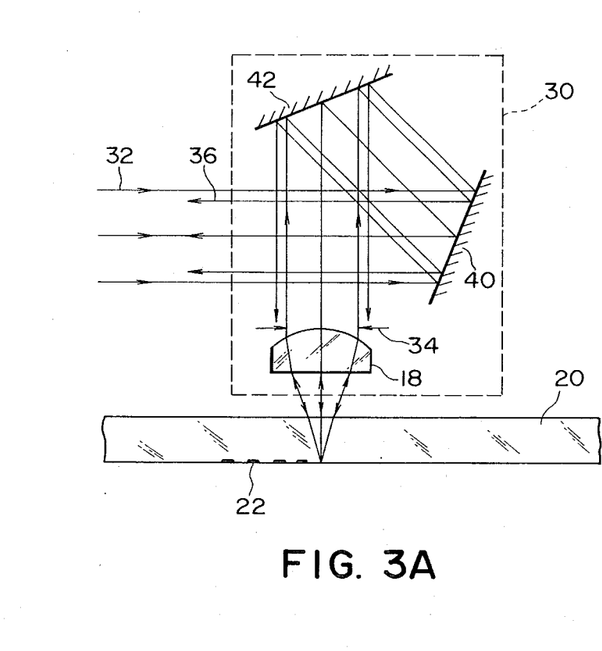
FIGS. 3A and 3B show a first embodiment of the present invention, FIG. 3A being an illustration of the construction of the movable portion, and FIG. 3B being an illustration of a state in which the movable portion is inclined.
Figure 3B:
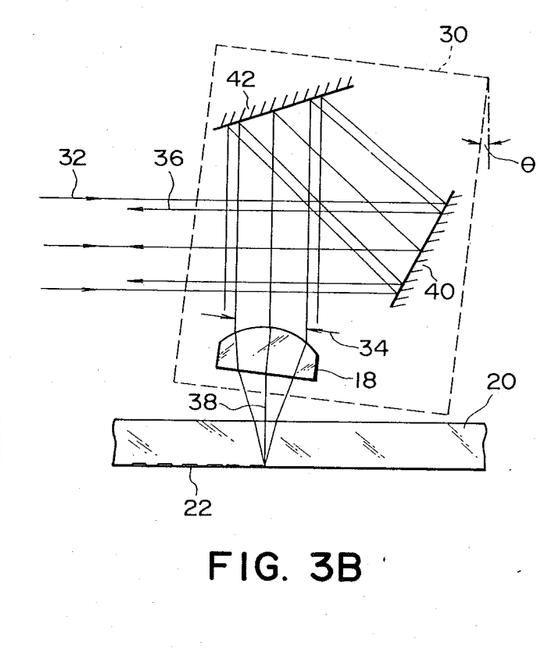

FIGS. 3A and 3B show a first embodiment of the present invention.

In this first embodiment, reflecting surfaces 40, 42 which are deflecting means, a condensing lens 18 which are condensing means and a stop 34 together constitute a movable portion 30.

In FIGS. 3A and 3B, reference numeral 32 designates an incident light beam, reference numeral 20 denotes a substrate, reference numeral 22 designates an information recording portion, and reference numeral 36 denotes a reflected light beam.

FIG. 3A shows the normal state, and FIG. 3B shows a state in which the movable portion 30 is inclined. As shown in FIG. 3A, in the normal state, the reflected light beam 36 is transmitted through the entire effective diameter of the stop 34.

FIG. 3B, as described above, shows a state in which the movable portion 30 is inclined by $\theta$ in the plane of the drawing sheet, and the light beam reflected by the reflecting surface 40 travels at an angle different from that in the normal state, but the light beam corrected and reflected by the reflecting surface 42 becomes perpendicular to the substrate 20. In this case, the condensing lens 18 is inclined by an angle $\theta$ with respect to an axis 38 perpendicular to the substrate 20 and therefore, the light beam reflected by the reflecting surface 42 enters the condensing lens 18 from an off-axis direction but enters the substrate 20 substantially perpendicularly thereto. Therefore, the light beam reflected by the substrate 20 does not create any lateral deviation with respect to the stop 34 and thus does not experience any reduction in quantity of light, and becomes the reflected light beam 36 having substantially the same center of the optic axis as the center of the optic axis of the incident light beam 32 while having a quantity of light substantially equal to that during the normal state, and is detected by a photodetector (not shown).

Figure 4A:
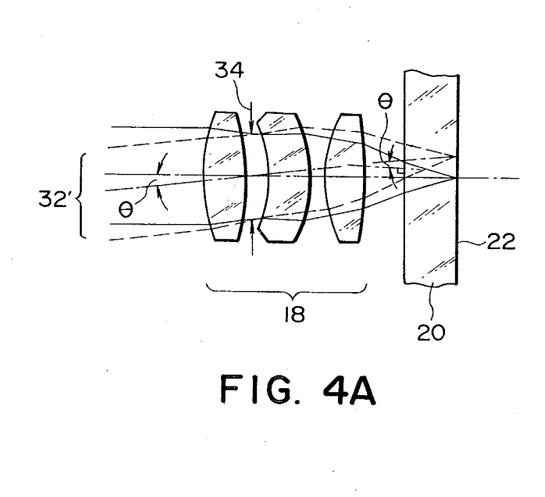
FIGS. 4A and 4B show methods of correcting the aberrations of lenses used in the head of the prior art and the head of the present invention.

As regards the condensing lens used in the present invention, it is desirable to design such lens by a method different from the off-axis aberration correcting method heretofore practised. A lens off-axis aberration correcting method suitable for use in the present invention will hereinafter be described by reference to FIGS. 4A and 4B. FIG. 4A shows the condensing lens off-axis aberration correcting method practised in the prior art. A light beam entering in parallelism to the optic axis is condensed on the information recording portion 22 of a substrate 20 substantially without aberrations by a condensing lens 18. Also, a light beam 32' deflected by the mirrors 14 and 16 in FIG. 1 and entering at an angle $\theta$ with respect to the optic axis is designed to be condensed at a different position on the information recording portion 22 through the lens 18 and the substrate 20 without aberrations.

Figure 4B:
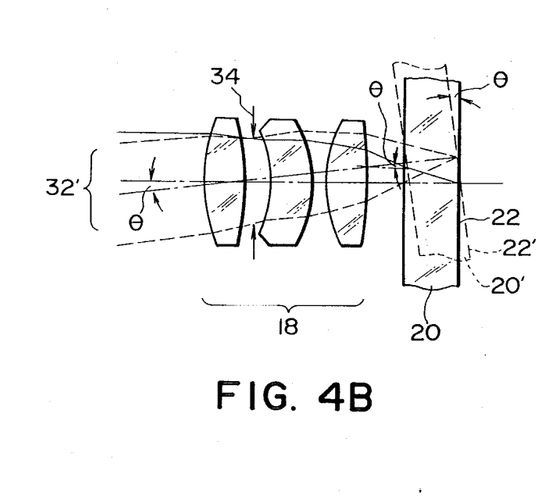

In contrast, as regards the condensing lens used in the present invention, it is preferable to effect aberration correction in accordance with a principle different from that of the prior art. In FIG. 4B, the light beam parallel to the optic axis is designed to be condensed on the information recording portion 22 on the substrate 20 without aberrations, whereas with regard to the light beam 32' entering at an angle θ with respect to the optic axis, aberration correction may be effected so that as shown, the light beam 32' may be imaged on the information recording portion 22' on the substrate 20' inclined by the angle θ without aberrations.

In the present invention, where a light beam inclined by θ with respect to the optic axis enters as shown in FIG. 3B, the substrate 20 is inclined by the same angle θ with respect to the optic axis of the lens 18 and therefore, by using such a lens, it becomes possible to completely correct coma and astigmatism which would occur when the lens according to the prior art is used.

In this first embodiment, the reflecting surfaces 40, 42 and the condensing lens 18 are integrally constructed in the movable portion 30, but it is also possible to hold only the condensing lens 18 of relatively light weight highly accurately perpendicularly to the substrate 20 and construct the reflecting surfaces 40 and 42 having a predetermined angle relation for fine movement.

In this case, the light beam reflected by the reflecting surface 42 becomes perpendicular to the substrate 20 and the optic axis of the condensing lens 18 also becomes completely perpendicular to the substrate 20 and thus, the light beam reflected by the reflecting surface 42 enters from the direction of the optic axis of the condensing lens 18.

As regards the address position information when the inclination of the condensing lens is permitted, use may be made of the position information of the nordal point on the substrate 20 side of the condensing lens 18 as described in Japanese Laid-open patent application No. 1102/1976 filed on June 21, 1974.

[Second Embodiment]

Figure 5:
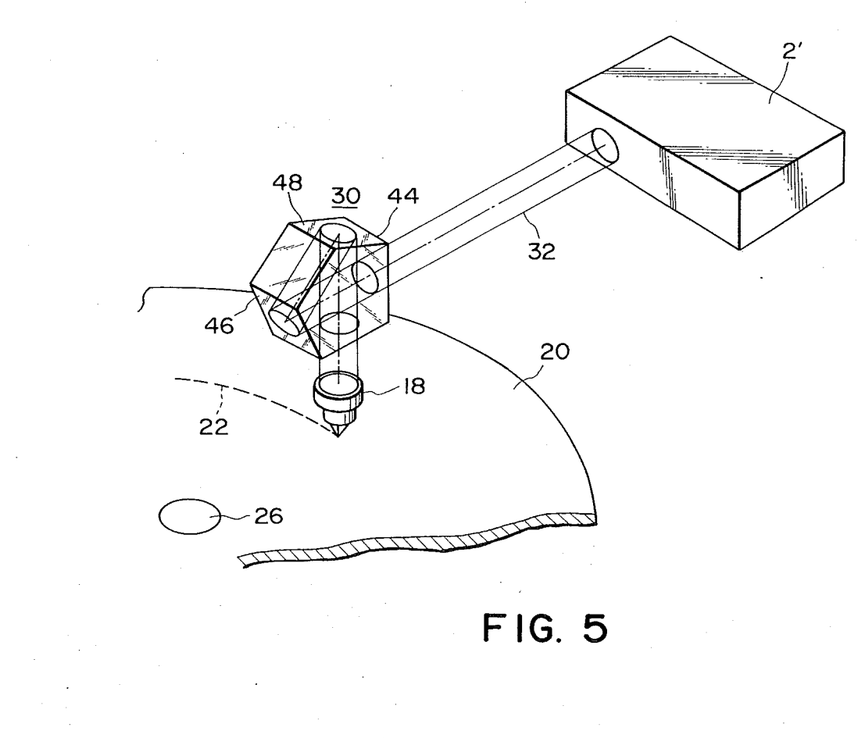
FIG. 5 illustrates the construction of a second embodiment of the present invention.

FIG. 5 shows a second embodiment of the present invention. A feature of the second embodiment is that instead of the two reflecting surfaces in the movable portion of the first embodiment, a penta prism is used in the movable portion.

In FIG. 5, reference numeral 2' designates a light source unit comprising a light source such as a laser, a collimater lens, a beam splitter, a detector lens and a photodelector, reference numeral 32 denotes an incident light beam, and reference numeral 44 designates a penta prism which is deflecting means The movable portion 30 is formed by the penta prism 44 and a condensing lens 18 which is condensing means.

In this second embodiment, the incident light beam 32 is emitted from the light source unit 2' radially of a recording medium 20 in a plane parallel to the surface of the recording medium 20. This incident light beam 32 is twice reflected in the penta prism 44 and becomes a light beam perpendicular to the substrate 20, and is condensed on an information recording portion 22 by the condensing lens 18.

Even when the movable portion 30 is inclined, the inclination of the light beam is corrected by the penta prism 44 on the basis of a principle similar to that of the first embodiment, and the light beam reflected by the penta prism 44 and entering the substrate 20 becomes perpendicular to the substrate 20. During access, the movable portion constituted by the penta prism 44 and the condensing lens 18 moves on a guide rail (not shown) provided in parallelism to the incident light beam 32 and high-speed access is effected.

In the second embodiment, the reflecting surfaces for the light beam are the surfaces 46 and 48 of the penta prism 44 and therefore, no angle setting error of these two surfaces 46 and 48 occurs during the use.

Also, the penta prism 44 may be manufactured by polishing an elongate glass bar and cutting out it, and this leads to easy mass production of such prism which in turn means inexpensiveness of the penta prism.

Further, in the second embodiment, if the condensing lens 18 is constituted by a planar type lens such as a hologram lens, a Celfoc lens or a planar microlens and is cemented to the penta prism 44, the relative position adjustment of the penta prism 44 and the condensing lens 18 will become unnecessary and an optical head device which is more compact and lighter in weight can be realized.

[Third Embodiment]

Figure 6:
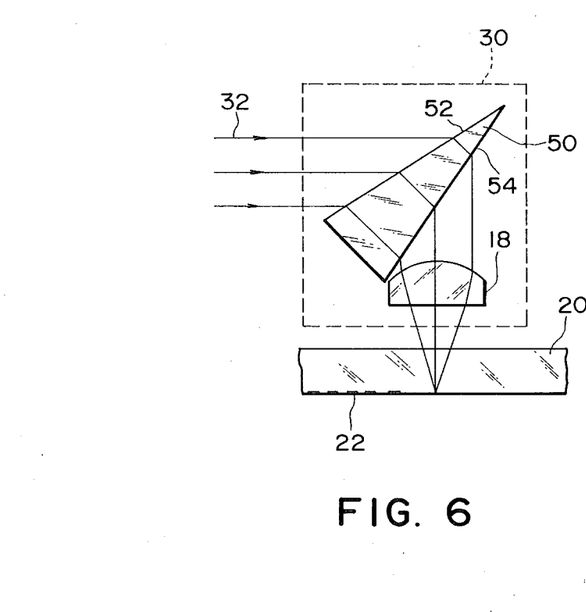
FIG. 6 illustrates the construction of the movable portion of a third embodiment of the present invention.

FIG. 6 shows a third embodiment of the present invention. A feature of this third embodiment is that a prism 50 is used as the light deflecting means in the movable portion 30. In the third embodiment, the movable portion 30 comprises the prism 50 and the condensing lens 18 which is condensing means, and in the prism 50, the angle of incidence with respect to a first surface 52 thereof and the angle of emergence with respect to a second surface 54 thereof are equal to each other, and the prism 50 is designed to form an arrangement of so-called "minimum declination".

In the third embodiment, the incident light beam 32 is deflected by the first surface 52 of the prism 50 and is further deflected in a direction perpendicular to the substrate 20 by the second surface 54 of the prism 50, and is condensed on the information recording portion 22 of the substrate 20 by the condensing lens 18.

In the third emdodiment, even if the movable portion 30 is inclined by a minute angle and the prism 50 and the condensing lens 18 are inclined by the same angle, no variation in the angle of the emergent light beam with respect to the inclination of the prism 50 will occur and the light beam will emerge perpendicularly to the substrate 20 because the prism 50 assumes the arrangement of "minimum declination" as previously mentioned.

While a single prism 50 is used in the third embodiment, a plurality of prisms may also be used if they as a whole satisfy the minimum declination condition.

[Fourth Embodiment]

Figure 7:
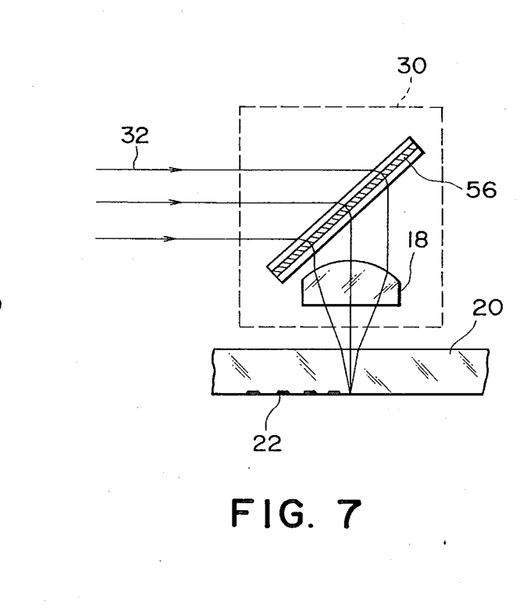
FIG. 7 illustrates the construction of the movable portion of a fourth embodiment of the present invention.

FIG. 7 shows a fourth embodiment of the present invention. A feature of this fourth embodiment is that a diffraction grating 56 is used as the light deflecting means of the movable portion 30. In the fourth embodiment, the movable portion 30 comprises the diffraction grating 56 and the condensing lens 18 which is condensing means, and the diffraction grating 56 is so disposed that the angle formed by the incident light beam with respect to the direction of the normal to the diffraction grating 56 is equal to the angle formed by the diffracted light beam with respect to the direction of said normal.

The incident light beam 52 is deflected in a direction perpendicular to the substrate 20 by the diffraction grating 56 and is condensed on the information recording portion 22 of the substrate 20 by the condensing lens 18.

In the fourth embodiment, even if the movable portion 30 is inclined by a minute angle, the diffracted light by the diffraction grating 56 will cause little or no variation in angle and will emerge substantially perpendicularly to the recoridng medium 20.

[Fifth Embodiment]

Figure 8:
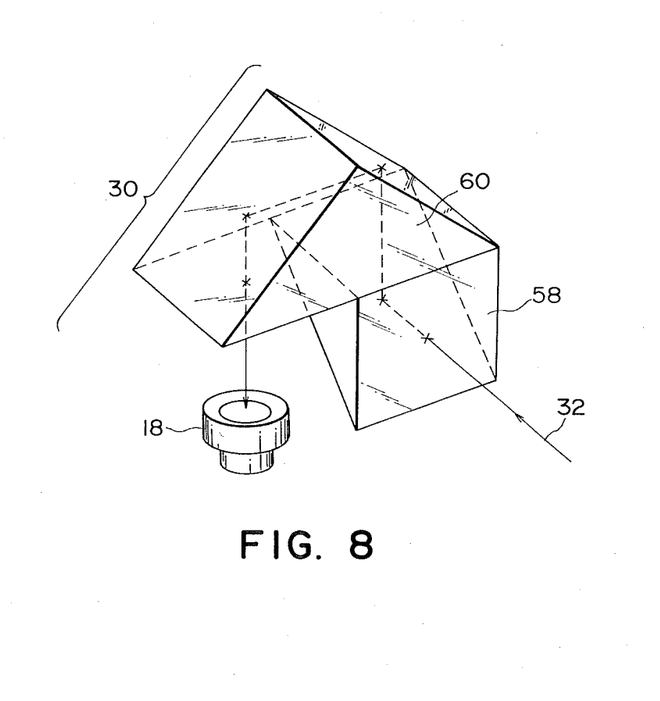
FIG. 8 illustrates the construction of the movable portion of a fifth embodiment of the present invention.

FIG. 8 shows a fifth embodiment of the present invention. A feature of this fifth embodiment is that two rectangular prisms are used as the light deflecting means.

In the fifth embodiment, the incident light beam is once reflected by a first rectangular prism 58, whereafter it is twice reflected by a second rectangular prism 60, emerges in a direction perpendicular to the substrate (not shown) and is condensed on the information recording portion (not shown) by the condensing lens 18 which is condensing means.

In the fifth embodiment, even if the movable portion 30 is rotated by a minute angle with the incident light beam 32 as the axis, the light beam emerging from the second rectangular prism 60 will remain to be substantially perpendicular to the substrate (not shown).

While the embodiments in which a reflecting mirror, prisms and a diffraction grating are discretely used as the light deflecting means of the movable portion of the optical head device have been shown above, the light deflecting means may be such that the light beam entering the recording medium continues to be maintained substantially perpendicular even when the movable portion moves minutely, and the light deflecting means can also be provided, for example, by combining a reflecting mirror, a prism, a diffraction grating, etc.

Figure 9:
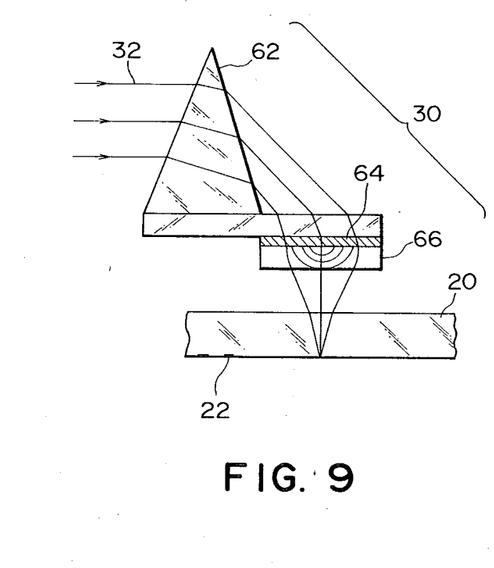
FIG. 9 illustrates the construction of the movable portion of a modification of the present invention.

FIG. 9 shows a modification of the present invention. A feature of this modification is that a prism 62 and a diffraction grating 64 are combined as the light deflecting means.

Designated by 66 is a planar microlens.

The incident light beam 32 is refracted by the prism 62, whereafter it is diffracted by the diffraction grating 64, is deflected in a direction perpendicular to the recording medium 20 and is condensed on the information recording portion 22 of the recording medium 20 by the planar microlens 66 which is a condensing lens.

Again in this modification, even if the movable portion 30 is rotated minutely, the light beam entering the recording medium 20 remains to be substantially perpendicular to the recoridng medium 20.

According to this modification, it is possible to negate both of the variation in the direction of refraction and the variation in the direction of diffraction caused by fluctuation of the wavelength of the light source.

Also, in this modification, the planar microlens 66 is used as the condensing lens, but by using an off-axis type hologram lens instead of the diffraction grating 64, the number of parts can be further reduced.

According to the present invention, as has been described above in detail, in an optical head device having a movable portion comprising chiefly light deflecting means and condensing means, even when the movable portion is inclined from its normal position during high-speed access, the light beam can emerge substantially perpendicuarly to the recording medium and therefore, the reflected light beam follows substantially the same optical path as the incident light beam and thus, loss of the quantity of light of the reflected light beam can be prevented and occurrence of any detection error of the reflected light beam can also be prevented. Further, the light beam enters the recording medium substantially perpendicularly thereto and therefore, occurrence of aberrations such as coma and astigmatism can also be prevented.

We claim:

1. An optical head device comprising a light source unit, deflecting means for varying the direction of travel of a light beam emitted from said light source unit, condensing means for condensing the light beam from said deflecting means on a recording medium, and moving means for moving said deflecting means and condensing means relative to said recording medium, said deflecting means consisting of plural reflecting surfaces having a predetermined fixed angle therebetween and said fixed angle being set so that the variation of an angle in the direction of the light beam from said deflecting means to said condensing means, resulting from rotative displacement of said deflecting means with respect to at least one axis, be extinguished.

2. An optical head device according to claim 1, wherein said deflecting means is formed by a prism.

3. An optical head device according to claim 1, wherein said deflecting means is formed by two rectangular prisms.

4. An optical head device comprising a fixed light source unit, deflecting means for varying the direction of the light beam from said light source unit, condensing means for condensing the light beam from said deflecting means on a recording medium, a housing for holding said deflecting means and said condensing means, and means for moving said housing relative to said recording medium, said deflecting means consisting of plural reflecting surfaces having a predetermined fixed angle therebetween and said fixed angle being set so that the axis of the light beam travelling from said deflecting means to said condensing means is always maintained perpendicular to the recording medium irrespective of rotative displacement of said deflecting means with respect to at least one axis.

5. An optical head device according to claim 4, wherein said condensing means has such an off-axis aberration characteristic that a light beam entering from a direction inclined by angle $\theta$ with respect to the optic axis of said condensing means form a substantially aberration-free point image on said recording medium.

* * * * *

UNITED STATES PATENT AND TRADEMARK OFFICE
CERTIFICATE OF CORRECTION

PATENT NO.  : 4,734,905
DATED       : March 29, 1988
INVENTOR(S) : TETSURO KUWAYAMA, ET AL.

It is certified that error appears in the above-identified patent and that said Letters Patent is hereby corrected as shown below:

Column 1,
    line 52, "pas" should read --pass--.

Column 2,
    line 57, "portin" should read --portion--.

Column 4,
    line 13, "are" should read --is--.

Column 5,
    line 44, "photodelector" should read --photodetector--.

Column 6,
    line 4, "out it" should read --it out--.

Column 7, line 45, "of" (first occurrence) should be deleted.

Signed and Sealed this

Twenty-sixth Day of July, 1988

Attest:

DONALD J. QUIGG

Attesting Officer      Commissioner of Patents and Trademarks